Aug. 20, 1957 U. S. BERGER ET AL 2,803,744

RADIANT ENERGY SIGNALING SYSTEM

Filed Aug. 14, 1953

3 Sheets-Sheet 1

INVENTORS: U. S. BERGER
J. F. LAIDIG

BY B. F. Stoddard
ATTORNEY

Aug. 20, 1957 U. S. BERGER ET AL 2,803,744

RADIANT ENERGY SIGNALING SYSTEM

Filed Aug. 14, 1953 3 Sheets-Sheet 2

INVENTORS: U. S. BERGER
J. F. LAIDIG

BY B. H. Stoddard
ATTORNEY

Aug. 20, 1957 U. S. BERGER ET AL 2,803,744

RADIANT ENERGY SIGNALING SYSTEM

Filed Aug. 14, 1953 3 Sheets-Sheet 3

INVENTORS: U. S. BERGER
J. F. LAIDIG

BY B. J. Stoddard

ATTORNEY

United States Patent Office 2,803,744

Patented Aug. 20, 1957

2,803,744

RADIANT ENERGY SIGNALING SYSTEM

Uriah S. Berger, Rockaway, and John F. Laidig, Mine Hill Township, Morris County, N. J., assignors to Bell Telephone Laboratories, Incorporated, New York, N. Y., a corporation of New York Application August 14, 1953, Serial No. 374,380

7 Claims. (Cl. 250—6)

This invention relates to multi-channel radiant energy signaling systems and, more particularly, to control equipment for use at customers' stations in such systems.

When a radiant energy signaling system is operated on a two-way basis, it has been the practice, especially in mobile radio-telephone communication systems, to employ one carrier frequency for signals transmitted from the central office to the customers' stations and a different carrier frequency for signals sent from the customers' stations to the central office. These two carrier frequency allocations constitute a single two-way radiant energy signaling channel which is used by the customers in much the same manner as a conventional telephone party line. In order to operate the customers' transmitting and receiving equipments over this two-frequency channel, each customer's station is usually provided with transmitting and receiving oscillators tuned respectively to the transmitting and receiving carrier frequencies allocated to the communication channel.

A single channel system of this type can be operated satisfactorily provided the number of customers' stations is not too large. However, if the number of customers' stations is large, the quality of service can be improved by employing two or more two-frequency radiant energy signaling channels for providing communication service on a multichannel basis. In the past, this has been accomplished by dividing the customers' stations into groups, each group of stations being assigned a different two-frequency channel for communication purposes. Although such a multi-channel system is an improvement over a single channel system, it has been determined that there are frequent instances when a customer finds that his assigned channel is busy at the time when he wishes to place a call. Consequently, he is unable to make his call immediately and is forced to monitor the channel until it becomes idle.

Since the probability of all the channels being busy simultaneously at a particular time is considerably less than the probability of any single channel being busy at that time, it can be understood that the operating efficiency of the system would be considerably improved by permitting each customer to initiate calls over any one of the two-frequency channels that is idle. This may be accomplished by providing each customer's station with a plurality of pairs of transmitting and receiving oscillators, each pair being tuned for operation over a respectively different one of the channels allocated to the system, which can be selectively conditioned for operation with the transmitting and receiving equipments at that station by manually operable switching means. Thus, when a customer moves his manual selector switch from one channel-selecting position to another, different pairs of oscillators are alternatively enabled for operation with his radio transmitter and receiver. With this method of operation, if a customer attempts to initiate a call over one channel and finds that the channel is busy, instead of being forced to wait until the channel becomes idle he can immediately switch the operating frequencies of his transmitting and receiving equipments to the two companion frequencies allotted to another channel.

Although this method of operation facilitates the initiation of calls from the customers' stations, it complicates the placing of calls from the central office to the customers' stations. This is due to the fact that a customer can receive a call from the central office only over the particular channel to which his communication equipment happens to be tuned at that time and an operator at the central office has no way of knowing the identity of this channel because the customer may have placed his selector switch in any one of its several channel-selecting positions. Under these circumstances, it would be necessary for an operator at the central office to attempt to communicate with a customer over first one channel and then another. It can be understood that such a procedure would consume an appreciable amount of the operator's time and would also involve use of several different channels thereby making them unnecessarily busy.

The placing of calls from the central office to the customers' stations may be considerably simplified if the transmission of selective calling signals from the central office to a customer's station is restricted to only a particular one of the signaling channels allotted to the communication system. In the past, this has been done by reserving one of the channels allocated to a system as a calling channel and by using it solely for the transmission of selective calling signals. However, with the present increased use of the frequency spectrum, channel allocations are too valuable to be used simply for selective calling purposes. This can be avoided by allowing each customer to call the central office over any channel he desires and by assigning each group of customers' stations a respectively different one of the channels for the transmission of selective calling signals from the central office, all channels being free to be used for the transmission of regular message signals.

In accordance with this method, after each customer has used his radio-telephone communication equipment, he should make certain that his channel-selecting switch is left in the position for tuning his equipment to the channel assigned to him for receiving selective calling signals. If he neglects to do this, then his equipment may be left tuned to another channel in which event he will be unable to receive selective calling signals as long as this condition exists. This is, of course, quite undesirable and it would therefore be advantageous to provide each customer's station with means for automatically tuning its radio-telephone communication equipment, when idle, to the particular channel assigned to it for the transmission of selective calling signals from the central office.

Accordingly, it is an object of this invention to provide a customer's station in a two-way multi-channel radiant energy signaling system with reverting means for automatically conditioning its signaling equipment for operation over a particular assigned signaling channel whenever the equipment is in an idle condition.

It is also an object of this invention to provide a customer's station in a system of the type mentioned above with locking means for preventing the customer's signaling equipment from being conditioned for operation with a signaling channel other than an assigned channel during periods when the assigned channel is idle.

These and other objects of the invention are accomplished by means that are explained in detail hereinafter in connection with the following description of the drawing in which.

Figure 1:
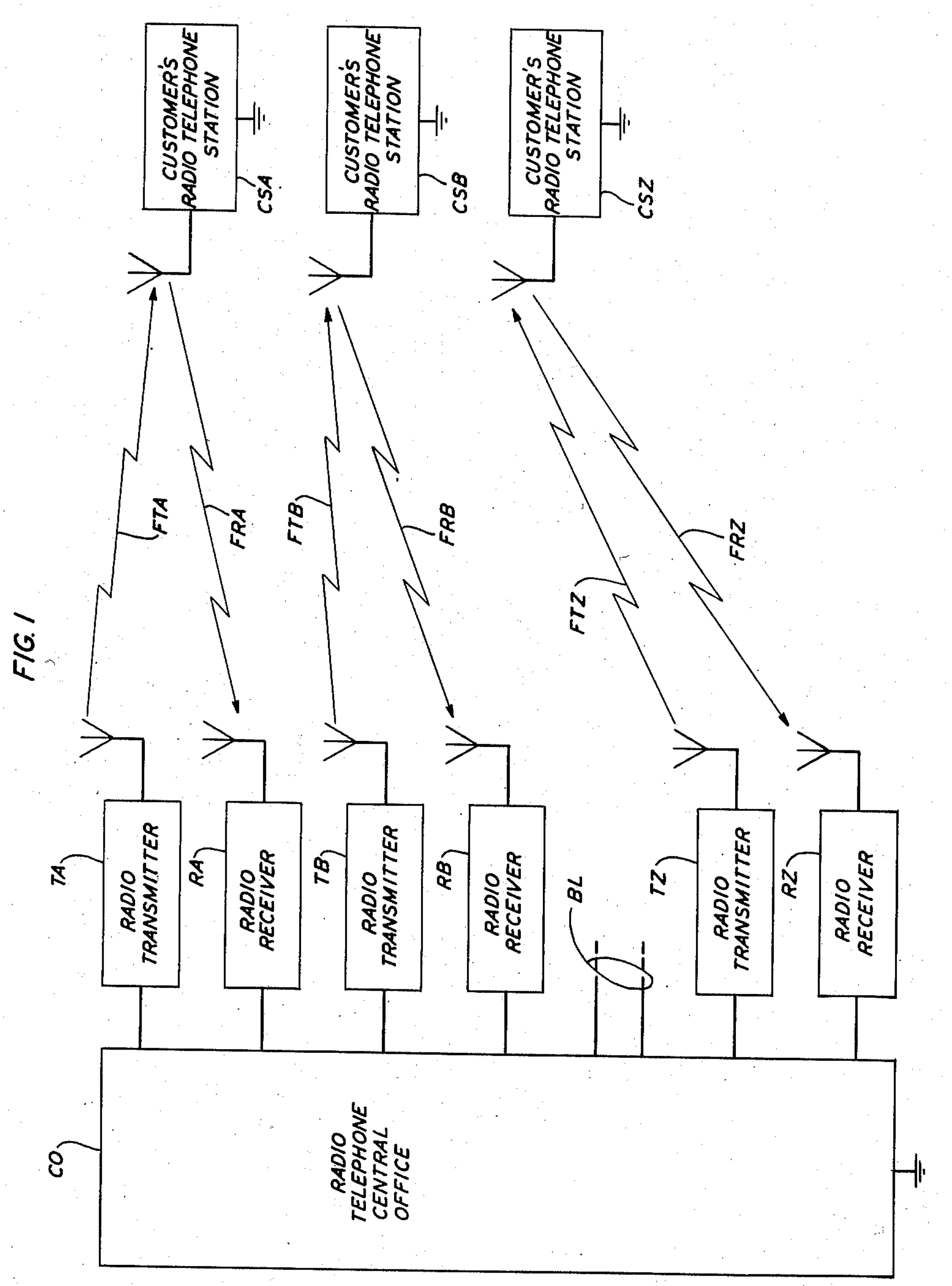
Fig. 1 is a block diagram of a two-way multi-channel radio-telephone communication system comprising a central office and a plurality of customers' stations.

In Fig. 1 a two-way multi-channel radio telephone system is shown to include a radio telephone central office CO and a plurality of customers' radio-telephone stations CSA, CSB, and CSZ. The system is further represented as having been allotted three two-frequency radiant energy signaling channels constituted by the frequency allocations FTA, FRA, FTB, FRB, FTZ and FRZ. The central office CO is shown to be provided with three pairs of radio transmitters and radio receivers TA, RA, TB, RB, TZ, and RZ, each pair being tuned to a respectively different one of the signaling channels as is indicated in the drawing. It is to be understood that the system is not limited to the use of three signaling channels but may employ any desired number. If more channels are used, then the central office should be provided with a correspondingly larger number of pairs of radio transmitters and receivers as is indicated by the broken lines BL.

It is to be further understood that, for purposes of simplicity, only three customers' stations have been shown whereas the system actually includes a much larger number of such stations which, as was stated above, are divided into groups. With this understanding in mind, it may be assumed that the three customers' stations shown in Fig. 1 are representative of three different groups of of customers' stations with the group represented by station CSA being assigned the frequency FTA for the transmission of selective calling signals from the central office CO, the group represented by station CSB being assigned the frequency FTB for receiving selective calling signals, and the group symbolized by station CSZ being assigned the frequency FTZ for the same purpose. In accordance with the discussion above, these three frequencies may also be used for the transmission of regular message signals to any of the customers' stations. Furthermore, any of the customers' stations may communicate with any of the central office radio receivers RA, RB, and RZ over their respective receiving frequencies FRA, FRB, and FRZ provided they are not being used at that time by some other station.

For example, if the customer at the station CSA attempts to place a call to the central office CO over the frequency FRA but finds that this frequency is being used by some other station, he may operate his channel-selector switch to use the frequency FRB if it is idle. At the termination of the call, he should move his channel-selector switch back so as to leave his equipment tuned to receive selective calling signals over the frequency FTA assigned to his group. If he does not do this, then his equipment will be left tuned to receive the frequency FTB with the result that he will be unable to receive selective calling signals over his assigned frequency FTA. To prevent this unintended lock-out, each customer's station is provided with reverting means for automatically tuning its communication equipment to its assigned channel after the termination of a call made over another channel. These reverting means are described hereinafter in connection with the following discussion of the station equipment shown in Fig. 2.

Figure 2:
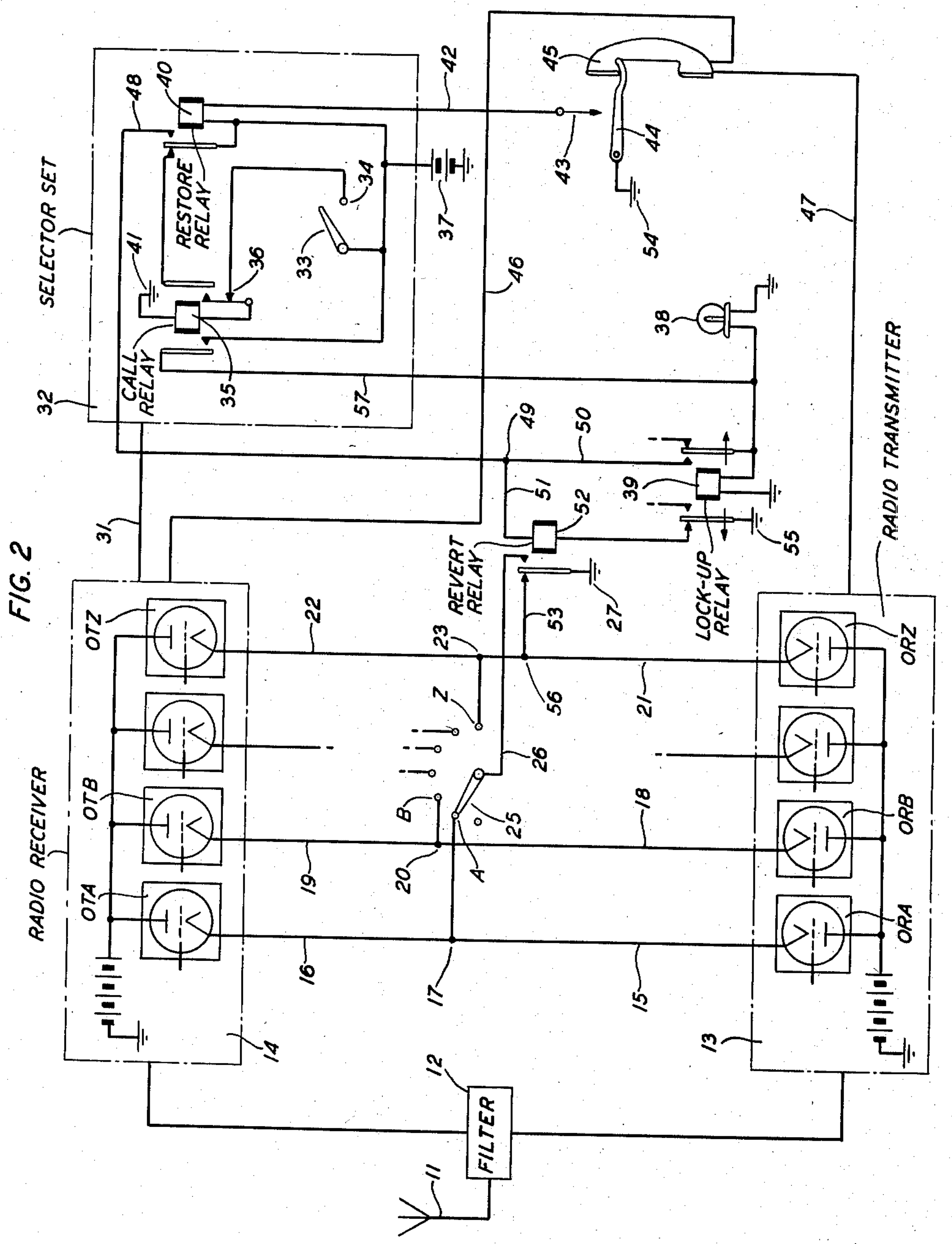
Fig. 2 is a circuit diagram of a customer's radio-telephone signaling station having incorporated therein one embodiment of the invention.

Fig. 2 shows the station equipment at any one of the customers' stations, such as the station CSA. This equipment comprises a transmitting-receiving antenna 11 coupled through a filter 12 to a radio transmitter 13 and a radio receiver 14. As is indicated in the drawing, the radio transmitter 13 is provided with a plurality of carrier oscillators ORA, ORB, and ORZ and the radio receiver 14 is equipped with a plurality of beating oscillators OTA, OTB, and OTZ. These oscillators may be of any suitable type known to those skilled in the art and are designed to produce electric wave energy of respectively different frequencies. The values of the frequencies of the energy generated by the carrier oscillators ORA, ORB, and ORZ correspond respectively to the carrier frequencies FRA, FRB, and FRZ to which the central office radio receivers RA, RB, and RZ are respectively tuned. The values of the frequencies of the energy produced by the beating oscillators OTA, OTB, and OTZ correspond respectively to the carrier frequencies FTA, FTB, and FTZ transmitted by the central office radio transmitters TA, TB andTZ, plus or minus the value of the intermediate frequency energy that is desired to be produced by the beating process in the radio receiver 14.

At is indicated in Fig. 2, the cathode leads 15 and 16 of the oscillators ORA and OTA, respectively, are connected to a junction point 17. Similarly, the cathode leads 18 and 19 of the oscillators ORB and OTB are connected to the junction point 20, and the cathode leads 21 and 22 of the oscillators ORZ and OTZ are connected to the junction point 23. In order to enable selectively any desired pair of the oscillators, the junction points 17, 20, and 23 are connected respectively to contacts A, B, and Z associated with a manually operable channel-selector switch 25. The switch 25 is connected over a conductor 26 to the make contact of a revert relay 52. When the relay 52 is energized in a manner described hereinafter, it operates its armature thereby connecting ground 27 to the conductor 26.

Under this condition, when it is desired to enable a particular pair of oscillators, such as the oscillators ORA and OTA, the switch 25 is moved to engage their associated switch contact, which in this instance is the contact A, thereby connecting ground 27 to the leads 15 and 16. This conditions the station equipment for communication over the channel constituted by the two carrier frequency allocations FTA and FRA. The station equipment can be conditioned for signaling over any of the other channels allotted to the system by moving the channel-selector switch 25 to the appropriate contact. It is to be understood that the invention is not limited to this specific enabling means as any other suitable oscillator-enabling means known to those skilled in the art may be used if desired.

The radio receiver 14 is coupled over a conductor 31 to selective signal receiving equipment 32 which may be of the type described in an article entitled "Selective calling for mobile telephone service," written by B. P. Cottrell and published on pages 32 and 34, inclusive, of "FM and Television," issue of January, 1948. As is explained in this article, the selector set 32 is provided with a stepping switch 33 responsive to a coded group of impulses. The selector set 32 also includes a call relay 35 which has its energizing winding connected over its associated normally closed contact 36 to the stepping switch contact 34. When contact 34 is engaged by the switch 33, a path is closed for current from battery 37 to energize the call relay 35.

Since, in each group of customers' stations, each customer's stepping switch is responsive to a different coded group of impulses, the transmission of a selective calling signal over the assigned calling channel will effect the energization of the call relay at only one of the customers' stations, this station being the one to which that particular coded signal is assigned. When this occurs, the call relay at that station, such as the call relay 35, operates its armatures. The operation of the left armature of relay 35 closes an obvious circuit over a lead 57 for current from battery 37 to energize a call lamp 38 and a lock-up relay 39 which is of the slow-to-release type. The operation of the right armature of relay 35 opens the relay contacts 36. However, the call relay 35 is maintained energized by current from battery 37 which now travels over the released armature of a restore relay 40 and over the operated armature of relay 35 to ground 41.

One side of the energizing winding of the restore relay 40 is connected to the battery 37 and the other side is connected by a lead 42 to a contact 43 associated with a hook switch 44. The hook switch 44 normally holds a telephone instrument 45 which is connected by a lead 46 to the radio receiver 14 and by a lead 47 to the radio transmitter 13. It is to be noted that the make contact of the restore relay 40 is connected by a lead 48 to the junction point 49. One side of the junction point 49 is connected by a lead 50 to the right make contact of the lock-up relay 39. Another side of the junction point 49 is connected by a lead 51 to one side of the energizing winding of a revert relay 52.

The revert relay 52 is provided with an armature for connecting ground 27 over its back contact to the leads extending to the cathodes of the particular transmitting and receiving oscillators associated with the calling channel assigned to this station for the reception of selective calling signals transmitted from the central office CO. In this embodiment of the invention, it is assumed that the calling channel assigned to the station of Fig. 2 is the channel constituted by the frequency allocations FTZ and FRZ. Accordingly, the back contact of the revert relay 52 is shown to be connected over a conductor 53 to the junction point 56 of the cathode leads 21 and 22 of the oscillators ORZ and OTZ associated with this channel. It is to be understood that the conductor 53 would be connected to the cathode leads of a different pair of oscillators if it should be desired to assign a different channel as a calling channel.

Thus, during the station's idle condition when the telephone instrument 45 is being held by the holder constituted by the hook switch 44, the armature of the revert relay 52 is in its released position so that ground 27 is connected over conductor 53 to the leads 21 and 22 of the oscillators ORZ and OTZ. This automatically conditions the station equipment for the reception of selective calling signals transmitted from the central office CO over the assigned calling channel, even though the channel-selecting switch 25 has been left in a different channel-selecting position.

As was stated above, each customer can initiate a call to the central office CO over any one of the channels that is idle. Assuming that the customer at the station shown at Fig. 2 should wish to place a call, then he would first remove his telephone instrument 45 from its holder constituted by the hook switch 44. This connects ground 54 over the hook switch contact 43 and lead 42 to the winding of the restore relay 40 thereby completing its energizing circuit and causing it to operate its armature. The operation of the armature of the restore relay 40 closes a path extending from the battery 37 over the operated armature of relay 40, along conductor 48 to the junction point 49, then along conductor 51 through the winding of the revert relay 52, and then over the back contact and released left armature of the lock-up relay 39 to ground 55. This causes the relay 52 to operate its armature thereby disconnecting ground 27 from the lead 53 and connecting it to the lead 26, thus activating the channel-selector switch 25.

If the switch 25 is left in the position to engage its contact A, as is shown in Fig. 2, the oscillators ORA and OTA will now be enabled and the station equipment will be conditioned for operation over their associated channel constituted by the frequency allocations FTA and FRA provided this channel is idle. If this channel happens to be busy at this time, which can be determined by listening in on the telephone 45, then the customer should move the switch 25 to a different channel-selecting position, such as to the position in which it will engage its contact B. This enables the oscillators OTB and ORB and conditions the station equipment for operation over the channel constituted by the frequency allocations FTB and FRB. If this channel is idle, the customer then proceeds with his call.

At the termination of the call, the customer places the telephone 45 on its hook switch holder 44. It would also be appropriate for him to move his channel-selector switch 25 to engage its contact Z for conditioning the station equipment for receiving selective calling signals over the assigned calling frequency allocation FTZ. However, this is not necessary because, when the telephone 45 is placed on the hook switch 44, the hook switch 44 disengages its contact 43 thereby opening the circuit described above for energizing the revert relay 52. Accordingly, relay 52 now releases its armature thereby disconnecting ground 27 from the channel-selector switch 25 which is, in effect, now disabled. At this same time, the release of the armature of relay 52 connects ground 27 to the junction point 56 thereby enabling the oscillators OTZ and ORZ associated with the assigned calling channel. Thus, the station equipment is automatically restored to the condition for operation over the assigned calling channel regardless of the position in which the customer may have left his channel-selector switch 25.

In placing a call from the central office CO to any one of the customers' stations, the central office operator transmits over the respectively assigned calling carrier frequency the particular selective calling signal which is assigned to the desired customer's station. For example, in calling the customer's station shown in Fig. 2, the appropriate selective calling signal is transmitted over the carrier frequency FTZ and, when received, causes the stepping switch 33 in the selective signal receiving equipment 32 to move into engagement with its contact 34. As was stated above, this closes a path for current from battery 37 to energize the call relay 35 which consequently operates its armatures.

The relay contacts associated with the right armature of relay 35 are of the make-before-break type so that the operation of this armature closes a locking circuit for relay 35 over the released armature of relay 40 before the contacts 36 are opened. At this same time, the operation of the left armature of relay 35 connects battery 37 to the call lamp 38 and to the energizing winding of the lockup relay 39. This causes relay 39 to operate its armatures. The right armature now connects the winding of relay 39 over conductors 50 and 48 to the make contact of the restore relay 40. The operation of the left armature of relay 39 disconnects ground 55 from the winding of the revert relay 52 so that it cannot be energized until after relay 39 has been de-energized and has released its armatures. Thus, the armature of relay 52 is locked in its released position where it connects ground 27 to the junction point 56 thereby maintaining the oscillators ORZ and OTZ, which are associated with the assigned calling channel, in an enabled condition.

Upon noticing that his call lamp 38 is illuminated, the customer at the station shown in Fig. 2 answers the call by removing his telephone 45 from the hook switch 44 thus permitting the hook switch 44 to engage its contact 43. This closes the circuit for energizing the restore relay 40 which operates its armature to effect the de-energization of the call relay 35. The energization of the restore relay 40 also effects the restoration of the stepping switch 33 to its initial position in the manner described in the above-mentioned article by B. P. Cottrell. The call relay 35 now releases its armatures to disconnect battery 37 from the conductor 57 leading to the call lamp 38 and to the winding of the lock-up relay 39.

However, at this same time, the operation of the armature of relay 40 applies current from battery 37 over conductors 48 and 50 to the right make contact of the lockup relay 39. Since relay 39 is of the slow-to-release type, its right armature will be held against its make contact long enough for its winding to receive the current now applied over the operated armature of relay 40. Therefore, the lock-up relay 39 will remain energized and its armatures will be maintained operated. A portion of the current now applied over the right armature of relay 39 is also supplied to illuminate the call lamp 38. This serves to inform the customer at that station that his channel-selector switch 25 is, in effect, disabled and that his station equipment is locked in the condition for operation over the assigned calling channel.

At the termination of this call, the customer hangs his telephone 45 on the hook switch 44 thereby causing the hook switch 44 to disengage its contact 43. This opens the energizing circuit of the restore relay 40 and causes it to release its armature. The release of the armature of relay 40 disconnects battery 37 from the right make contact of the lock-up relay 39. This causes relay 39 to release its armatures and also extinguishes the call lamp 38 to inform the customer that his station equipment has been restored to its normal idle condition.

As was stated above, the customer's station shown in Fig. 2 is so equipped as to enable the customer to place a call over any one of the channels that is idle. Accordingly, the customer may place a call over one of the unassigned channels even though his assigned calling channel is idle. This makes that particular unassigned channel become busy with the result that the central office operator cannot use it at that time for the transmission of selective calling signals to any of the customers in the group to which that channel is assigned as a calling channel. Therefore, in order to equally distribute the load among the allotted signaling channels and also to prevent a customer from making one of the other channels unnecessarily busy at a time when his assigned calling channel is idle, it is desirable to provide the customers' stations with locking means for preventing the customers from placing calls over other channels when their respectively assigned calling channels are idle. These locking means are described hereinafter in connection with the following discussion of the station equipment shown in Fig 3.

Figure 3:
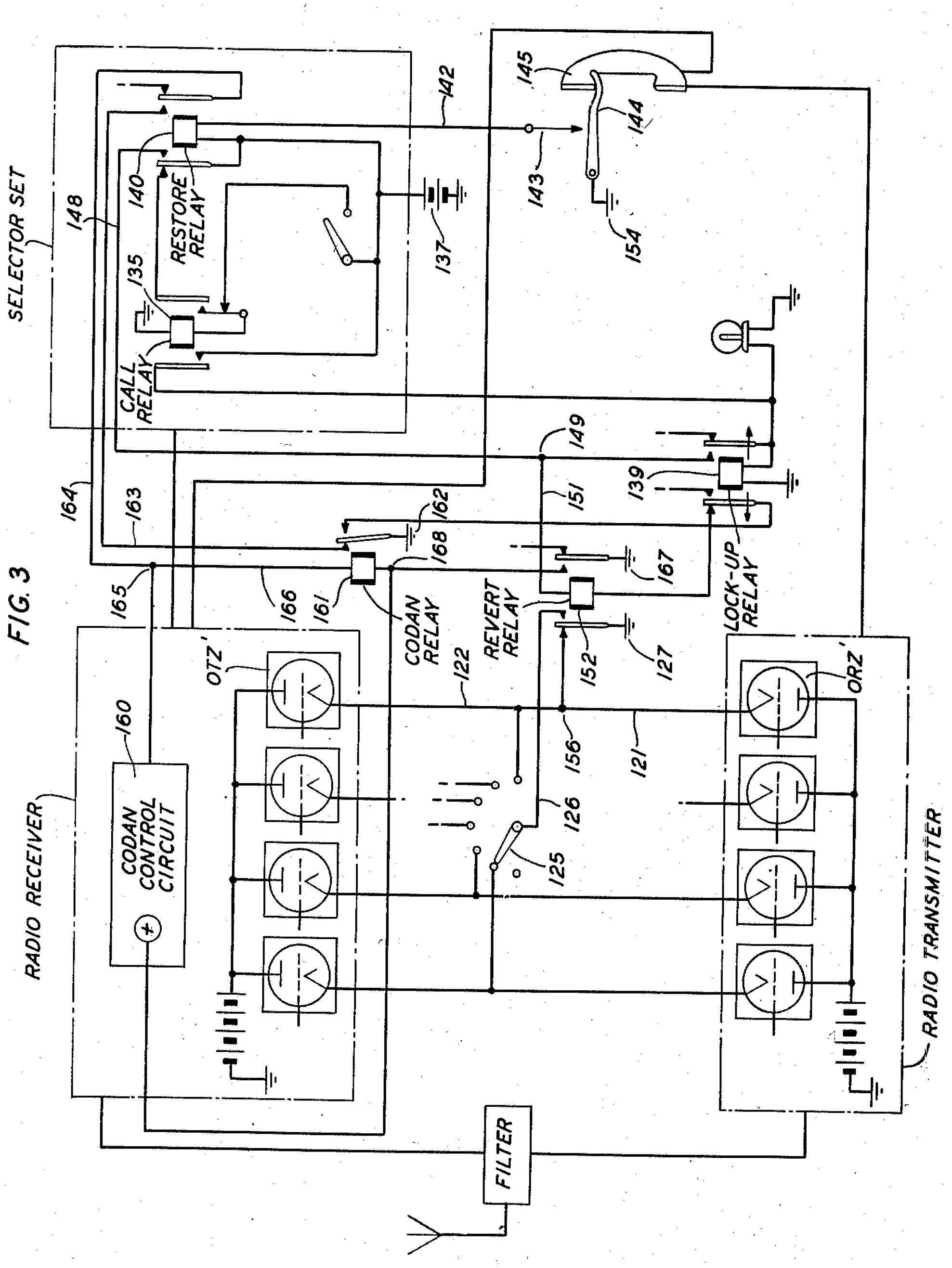
Fig. 3 is a circuit diagram of another customer's radio-telephone signaling station employing a modification of the invention.

The station equipment shown in Fig. 3 is basically the same as that shown in Fig. 2 except that it is provided with additional equipment which includes a codan control circuit 160 with an associated codan relay 161, an extra armature and set of contacts for the restore relay 140, and additional circuit conductors. The codan control circuit 160 may be of any suitable type known to those skilled in the art, such as the type described on page 653 of F. E. Terman's "Radio Engineers' Handbook." This is the type which responds to the reception of carrier energy having a magnitude in excess of a pre-selected threshold value by producing a voltage change or a current change at a point in its circuit which will effect the de-energization of the codan relay 161 for causing it to release its armature. Conversely, it responds to an absence of carrier energy above the threshold value by effecting the energization of the codan relay 161 for causing it to operate its armature.

This station equipment functions in the same manner as the station equipment shown in Fig. 2 when a selective calling signal is received from the central office operator and the customer answers by removing his telephone 145 from the hook switch 144. However, it functions differently from the station equipment of Fig. 2 when the customer initiates a call and this will now be described.

In the idle condition of the station shown in Fig. 3, the call relay 135, the restore relay 140, the lock-up relay 139, and the revert relay 152 are all de-energized. Consequently, ground 127 is connected over the released left armature of the revert relay 152 to the junction point 156 and then over the leads 121 and 122 to the oscillators OTZ' and ORZ' associated with the calling channel assigned to this station, thereby conditioning the station equipment for operation over this channel regardless of the position of the channel-selector switch 125. If this channel is idle, then the codan control circuit 160 will cause the codan relay 161 to become energized as was stated above. Accordingly, the armature of the codan relay 161 will now be in its operated position for connecting ground 162 over the lead 163 to the right make contact of the restore relay 140.

Now, when the customer at the station shown in Fig. 3 wishes to place a call, he first removes his telephone 145 from the hook switch 144. This connects ground 154 over the hook switch contact 143 and the lead 142 to the winding of the restore relay 140, thereby completing its energizing circuit and causing it to operate its armatures. The operation of the right armature of relay 140 closes a circuit extending from ground 162 over the operated armature of the codan relay 161, along conductor 163, over the operated right armature of relay 140, along conductor 164 to the junction point 165, and then along conductor 166 to the winding of the codan relay 161. Consequently, the codan relay 161 will now, in effect, be locked up under the control of the restore relay 140 and the hook switch 144 and will hold its armature in its operated position regardless of any voltage or current changes that may subsequently occur in the codan control circuit 160.

At this time, the operation of the left armature of relay 140 connects battery 137 over conductor 148 to the junction point 149 and then over the lead 151 to the winding of the revert relay 152. However, even though the left armature of relay 139 is in its released position, the energizing circuit of the revert relay 152 is open at the back contact of the codan relay 161 so that relay 152 will be held in its unenergized condition to prevent ground 127 from being applied over conductor 126 to the channel-selector switch 125. Thus, any operation of the channel-selector switch 125 at this time will be ineffectual to condition the station equipment for operation over any channel other than the assigned calling channel.

As soon as the customer proceeds with his call, this channel becomes busy with the result that a voltage or current change is produced in the codan control circuit 160. This change cannot now effect the de-energization of the codan relay 161 because, as was explained above, it is locked in its energized condition under the control of the hook switch 144. The station equipment therefore remains locked in the condition for operation over the assigned calling channel for the duration of the call.

At the termination of the call, the customer replaces his telephone 145 on the hook switch 144 thereby disengaging it from its contact 143. This de-energizes the restore relay 140 which releases its armatures to restore the station equipment to its normal idle condition.

If, at the time when the customer at the station shown in Fig. 3 lifted up his telephone 145 to initiate a call, the assigned calling channel should be busy, then, as was explained above, the codan relay 161 would be deenergized and its armature would be in its released position for connecting ground 162 over the released left armature of relay 139 to one side of the winding of the revert relay 152. Under this condition, when relay 140 operates its armatures in response to the engagement of the hook switch 144 with its contact 143, the left armature of relay 140 will connect battery 137 over leads 148 and 151 to the other side of the winding of relay 152. This causes relay 152 to operate its armatures. The left armature of relay 152 now connects ground 127 over lead 126 to enable the channel-selector switch 125 so that the station equipment may now be conditioned for operation over any one of the channels that is idle.

At the same time, the operation of the right armature of the revert relay 152 connects ground 167 to the junction point 168 thereby shunting the codan relay 161 and, in effect, locking it in its unenergized condition for the duration of the call. If the codan relay 161 were not thus held de-energized, then it might subsequently be energized in response to a momentary fading in the strength of the received carrier. In such an event, the operation of the armature of the codan relay 161 would open the energizing circuit of the revert relay 152 which, in turn, would release its armatures to disconnect ground 127 from the channel-selector switch 125 thereby disabling the selected oscillators. However, this is prevented by locking the codan relay 161 in its unenergized condition with the result that the station equipment remains conditioned for operation over the selected channel for the duration of the call.

This particular embodiment of the invention has been described in order to explain the principles and features of operation of the invention. It is to be understood that the invention is not limited to the specific circuit construction shown in the drawing as various modifications may be made without exceeding the scope of the invention which is to be limited only by the claims appended hereto.

What is claimed is:

1. In a radiant energy communication system having a plurality of radiant energy signaling channels allotted thereto for the transmission of carrier waves, a signaling station comprising in combination carrier wave signaling equipment, first means for effecting the placing of said equipment in condition for operation over any one of said channels, second means for effecting the placing of said equipment in condition for operation over only an assigned one of said channels, a first electroresponsive device for enabling said first and second means alternatively, a first circuit for energizing said device, said first circuit having first and second portions connected in series, said first portion being normally open, said second portion being normally closed, a telephone instrument coupled to said signaling equipment, a holder for removably holding said instrument, and a second electroresponsive device responsive to the removal of said instrument from said holder for closing said first portion of said first circuit, said signaling station being additionally characterized by the fact that it further comprises selective signal receiving equipment for responding to selective calling signals received at said station, said selective signal receiving equipment including a normally unenergized call relay, a third electroresponsive device, and a second circuit for energizing said third electroresponsive device, said second circuit being normally open, said selective signal receiving equipment being responsive to the reception of an assigned selective calling signal for energizing said call relay, means actuated in response to the energization of said call relay for closing said second circuit, said third electroresponsive device being responsive to the closure of said second circuit for opening said second portion of said first circuit.

2. A radiant energy communication system in accordance with claim 1 wherein said signaling station includes a locking circuit for holding said third electro-responsive device energized after closure of said second circuit, said locking circuit being normally open, said holder being responsive to the removal of said instrument therefrom for effecting the opening of said second circuit after its closure and for effecting the closure of said locking circuit.

3. In a radiant energy communication system having a plurality of radiant energy signaling channels allotted thereto for the transmission of carrier waves, a signaling station comprising in combination carrier wave signaling equipment, first means for effecting the placing of said equipment in the condition for operation over any one of said channels, second means for effecting the placing of said equipment in the condition for operation over only an assigned one of said channels, a first electroresponsive device for enabling said first and second means alternatively, a circuit for energizing said device, said circuit having first and second portions in series, a telephone instrument coupled to said signaling equipment, a holder for removably holding said instrument, a second electroresponsive device responsive to the removal of said instrument from said holder for closing said first portion of said circuit, and a carrier-responsive device responsive to the reception of carrier waves at said station for closing a second portion of said circuit, said carrier-responsive device being responsive to the absence of received carrier waves at said station for holding said second portion of said circuit open.

4. In a radiant energy communication system having a plurality of radiant energy signaling channels allotted thereto for the transmission of carrier waves, a signaling station comprising in combination carrier wave signaling equipment, first means for effecting the conditioning of said equipment for operation over any one of said channels, second means for effecting the conditioning of said equipment for operation over only an assigned one of said channels, a first electroresponsive device for enabling said first and second means alternatively, a control relay having an energized condition and a de-energized condition, carrier-responsive means responsive to the reception of carrier waves at said station for placing said relay in one of said conditions, said carrier-responsive means being responsive to an absence of received carrier waves at said station for placing said relay in the other of its conditions, a circuit for energizing said device, said circuit having first and second portions in series, said first portion being held closed when said relay is in one condition and being held open when said relay is in its other condition, said second portion being normally open, a telephone instrument coupled to said signaling equipment, a holder for removably holding said instrlument, and a second electroresponsive device responsive to the removal of said instrument from said holder for closing said second portion of said circuit.

5. A radiant energy communication system in accordance with claim 4 wherein said signaling station includes a shunt circuit for shunting said control relay, said shunt circuit being normally open, and an instrumentality actuated by said first electroresponsive device for closing said shunt circuit.

6. A radiant energy communication system in accordance with claim 4 wherein said signaling station includes a locking circuit for holding said control relay in its energized condition, said locking circuit being normally open, and an instrumentality actuated by said second electroresponsive device for closing said locking circuit.

7. A radiant energy communication system in accordance with claim 4 wherein said signaling station includes a locking circuit for said control relay, said locking circuit having a closed condition for holding said relay in its energized condition, said locking circuit also having an open condition, and an instrumentality actuated by said relay for placing said locking circuit in its open condition.

References Cited in the file of this patent

UNITED STATES PATENTS

| | | |
|---|---|---|
| 2,330,241 | Roberts | Sept. 28, 1943 |
| 2,429,607 | Capen | Oct. 28, 1947 |
| 2,479,701 | Ress | Aug. 23, 1949 |
| 2,649,541 | McDavitt | Aug. 18, 1953 |
| 2,670,435 | Mitchell | Feb. 23, 1954 |
| 2,694,141 | Mitchell | Nov. 9, 1954 |